(12) United States Patent
Green et al.

(10) Patent No.: US 9,070,390 B2
(45) Date of Patent: Jun. 30, 2015

(54) MODIFIED AREAL DENSITIES FOR DEGRADED STORAGE DEVICE READ HEADS

(71) Applicant: HGST Netherlands B.V., Amsterdam (NL)

(72) Inventors: Paul Marion Green, Hollister, CA (US); Remmelt Pit, Palo Alto, CA (US); David H. Jen, San Jose, CA (US)

(*) Notice: Subject to any disclaimer, the term of this patent is extended or adjusted under 35 U.S.C. 154(b) by 0 days.

(21) Appl. No.: 14/068,879

(22) Filed: Oct. 31, 2013

(65) Prior Publication Data
US 2015/0117173 A1   Apr. 30, 2015

(51) Int. Cl.
  *G11B 5/09*   (2006.01)
  *G11B 5/455*  (2006.01)
(52) U.S. Cl.
  CPC ..................................... *G11B 5/455* (2013.01)
(58) Field of Classification Search
  None
  See application file for complete search history.

(56) References Cited

U.S. PATENT DOCUMENTS

| | | | |
|---|---|---|---|
| 6,560,052 B2* | 5/2003 | Ng et al. | 360/48 |
| 6,957,379 B1* | 10/2005 | Patapoutian et al. | 714/774 |
| 7,012,771 B1 | 3/2006 | Asgari et al. | |
| 7,283,316 B2 | 10/2007 | Chiao et al. | |
| 7,362,529 B2 | 4/2008 | Chiao et al. | |
| 7,573,666 B2 | 8/2009 | Raymond | |
| 7,589,925 B1 | 9/2009 | Chiao et al. | |
| 7,656,598 B2 | 2/2010 | Iida | |
| 7,688,538 B1 | 3/2010 | Chen et al. | |
| 8,085,487 B1 | 12/2011 | Jung et al. | |
| 2002/0036852 A1* | 3/2002 | Leow et al. | 360/31 |
| 2002/0036853 A1* | 3/2002 | Quak et al. | 360/31 |
| 2011/0116186 A1* | 5/2011 | Jen et al. | 360/75 |

* cited by examiner

*Primary Examiner* — Paul Huber

(57) ABSTRACT

Systems, methods, and firmware for operating data storage devices and storage processors are provided herein. In one example, a data storage device is provided. The data storage device includes magnetic storage media configured to store data, read heads configured to read data from the magnetic storage media at associated areal densities, and a storage processor. The storage processor is configured to monitor read error rates of the read heads during operation of the data storage device to identify a degraded one of the read heads, and process at least the read error rates and an areal density of the degraded one of the read heads to modify the areal density of at least the degraded one of the read heads.

15 Claims, 6 Drawing Sheets

MODIFIED AREAL DENSITIES FOR DEGRADED STORAGE DEVICE READ HEADS

TECHNICAL FIELD

Aspects of the disclosure are related to the field of data storage systems, and in particular, reading and writing of data on magnetic storage media in data storage devices and systems.

TECHNICAL BACKGROUND

Computer and network systems such as personal computers, workstations, server systems, and cloud storage systems, typically include data storage systems for storing and retrieving data. These data storage systems can include data storage devices, such as hard disk drives, solid state storage devices, tape storage devices, and other mass storage devices.

In examples of magnetic storage media, such as rotating media hard disk drives, one or more write heads are employed to write data to the magnetic media, while associated read heads are employed to read data from the magnetic media. These write and read heads are configured during manufacturing to have manufacturer-specified areal read/write densities across the magnetic media, typically measured in bits per square inch, a combination of bits per inch (BPI) and tracks per inch (TPI). These manufacturer-specified areal densities are typically selected based on error rates for the read/write heads as determined during the manufacturing process. However, when particular read or write head elements of a storage device become degraded during operational use, the entire storage device is typically replaced.

To achieve a measure of reliability and availability, data storage systems can include multiple data storage devices in various arrays and configurations. One such data storage system is a redundant array of independent disks (RAID) and can be configured in with different architectures to satisfy various capacity, reliability, and availability requirements. The degraded performance discussed above can be especially cumbersome for arrayed storage systems. In typical arrayed storage systems, when a single data storage device fails or shows signs of degradation, the failing data storage device is typically discarded and a replacement data storage device is prepared to participate in the arrayed storage system.

Overview

To provide enhanced operation of storage media associated with data storage devices, such as rotating media-based hard drives, various systems, methods, and firmware are provided herein. In some examples, these systems, methods, and firmware can provide for data storage devices that include magnetic storage media configured to store data, read heads configured to read data from the magnetic storage media at associated areal densities, and a storage processor. The storage processor is configured to monitor read error rates of the read heads during operation of the data storage device to identify a degraded one of the read heads, and process at least the read error rates and an areal density of the degraded one of the read heads to modify the areal density of at least the degraded one of the read heads.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Various systems, methods, and firmware are provided for enhanced operation of data storage devices with one or more degraded read heads. Magnetic storage media, such as rotating media hard disk drives, typically include one or more write heads are employed to write data to the magnetic media, while associated read heads are employed to read data from the magnetic media. These write and read heads are configured during manufacturing to have manufacturer-specified areal read/write density across the magnetic media, typically measured in bits per square inch, a combination of bits per inch (BPI) and tracks per inch (TPI). The BPI indicates a linear density of bits along a specific track, while the TPI indicates a spacing or tightness of successive tracks of the magnetic media. In the discussion below, BPI is discussed as being modified, however, it should be understood that TPI can similarly be modified, and that both BPI and TPI can affect the areal density of a particular read/write head. During use of the magnetic storage media, particular read head or write head elements of a storage device can become degraded, leading to an increase in error rates for the degraded read or write head elements.

Additionally, these data storage devices can be deployed in data storage environments, such as redundant or arrayed storage systems which provide different levels of reliability or availability of data. Many of the enhanced features discussed herein are employed in individual data storage devices, as well as in the systems which interact with the data storage devices.

Figure 1:
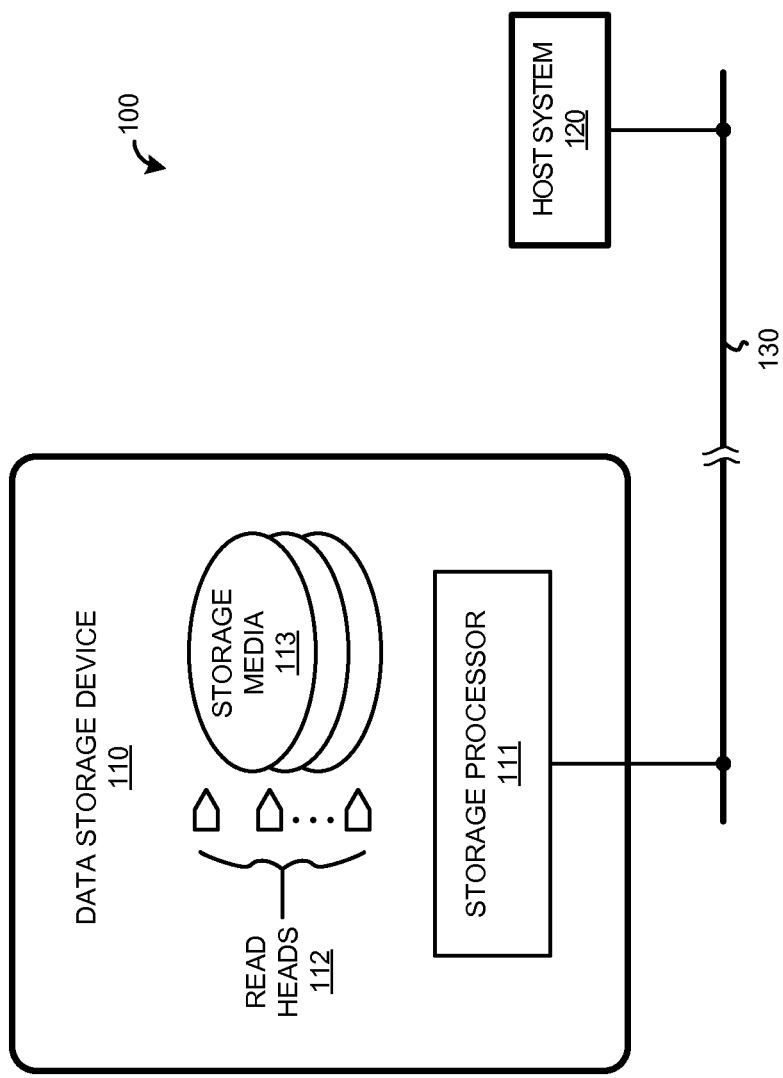
FIG. 1 is a system diagram illustrating a storage system.

In a first example of a storage system, FIG. 1 is presented. FIG. 1 is a system diagram illustrating storage system 100. Storage system 100 includes data storage device 110 and host system 120. Data storage device 110 and host system 120 communicate over bus 130. Although bus 130 is shown in FIG. 1, it should be understood that one or more discrete links can be employed between the elements of storage system 100.

Data storage device 110 includes storage processor 111, read heads 112, and storage media 113. Read heads 112 and storage media 113 are shown to illustrate elements of a magnetic storage medium, such as a rotating magnetic storage system found in a hard disk drive, although variations and further elements are possible. Read heads 112 can read data from associated portions of storage media 113, and are communicatively coupled to storage processor 111 or other elements of data storage device 110.

In operation, data storage device 110 can store computer-readable data for later retrieval, such as user data, system data, swap file data, and the like. Host system 120 can control at least data storage and retrieval operations of data storage device 110 over bus 130, as well as control the transfer of data to other systems and equipment, such as to processing systems, network interfaces, and the like.

As mentioned above, during operation of data storage device 110, the performance of read heads 112 can become degraded over time. This degradation can lead to data read errors and data corruption for data retrieved from storage media 113, and in some cases can render data storage device 113 unusable. These read error rates can also lead to performance degradation, causing data storage device 100 to slow down during reading operations while repeatedly attempting to read the data. However, in the examples discussed herein, various systems, methods, and firmware are provided for enhanced operation of data storage devices with one or more degraded read heads.

Figure 2:
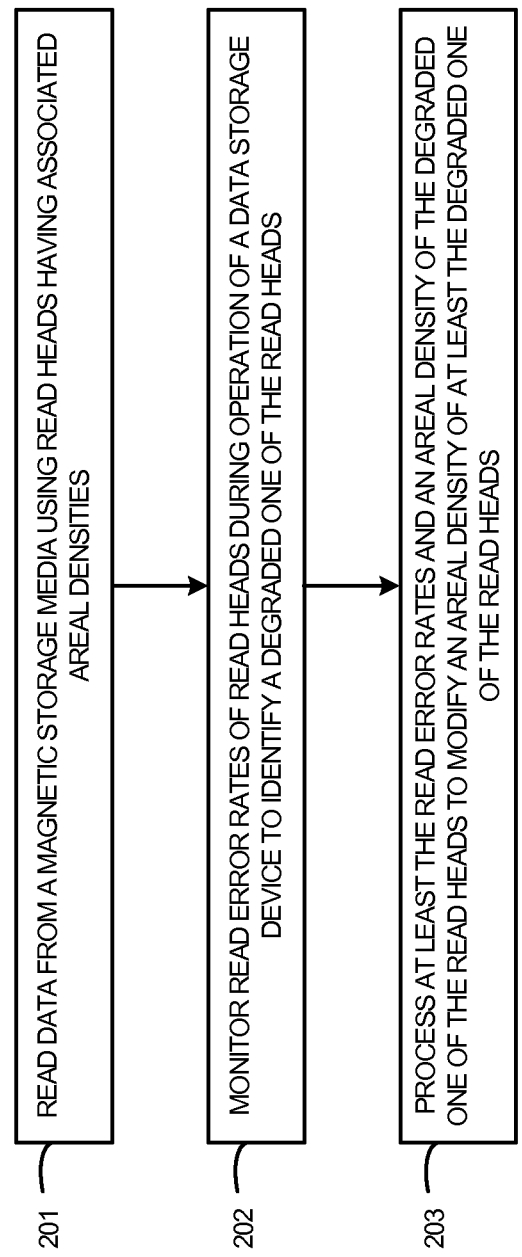
FIG. 2 is a flow diagram illustrating a method of operation of a data storage device.

To illustrate example operations for storage system 100, FIG. 2 is presented. FIG. 2 is a flow diagram illustrating a method of operation of data storage device 110. The operations of FIG. 2 are referenced below parenthetically. In FIG. 2, data storage device 110 reads (201) data from a magnetic storage media using read heads having associated areal densities. In this example, the magnetic storage media is storage media 113 which is read using read heads 112. Reading of data can occur during normal operation of data storage device 110, such as responsive to read commands issued by host system 120 over bus 130, among other operations. Storage processor 111 can receive external read commands and responsively issue read commands to further equipment of storage device 110 for reading data from storage media 113 using read heads 112. The areal density associated with each of read heads 112 relates to a density of data on storage media 113, such as a recording density measured in BPI used to write data to storage media 113. Typically, read heads 112 each have a different initial areal density which is set during manufacturing of data storage device 110. Although these areal densities set during manufacturing can be specified to ramp or scale higher as a particular read/write head moves from the outer edge to the inner edge of the surface of a particular magnetic media, due to circular geometries and rotational properties of the magnetic media, it should be understood that these manufacturing-specified areal densities are conventionally unchanged after manufacturing of the data storage device.

Data storage device 110 monitors (202) read error rates of read heads 112 during operation of data storage device 110 to identify a degraded one of the read heads. The read error rates can be determined by storage processor 111 during read operations of data storage device 110 using ones of read heads 112. The read operations can be all read operations performed by data storage device 110, or a subset thereof. The read error rates can be stored in a data structure included in a computer-readable memory device of data storage device 110 and accessible by storage processor 111. The read error rates can be accumulated over a period of time, such the entire operational lifetime of data storage device 110, for the duration of the current power cycle, until a threshold amount of errors have been logged, or for other durations. In many examples, the read error rate of each read head is monitored and a separate record or tabulation for each read head is maintained.

In some examples, the read error rates each comprise a soft error rate (SER) for data read from an associated read head. The SER can include data errors that are correctable via error correction algorithms, such as error checking and correcting (ECC), forward error correcting (FEC), cyclic redundancy checks (CRC), Reed-Solomon codes, checksums, parity bits, or other errors in data read by the read heads.

Data storage device 110 processes (203) at least the read error rates and an areal density of the degraded one of the read heads to modify an areal density of at least the degraded one of the read heads. As data storage device 110 monitors the read error rates of read heads 112, these read error rates can exceed desirable levels, such as an error threshold level. Excessive read errors can indicate that a read head is producing more errors reading data from an associated magnetic media portion than is acceptable, and can indicate a degraded read head. Data storage device 110 monitors read error rates for all read heads 112, and thus one or more read heads can experience degraded performance, although at different times. However, for clarity in this example a single read head will be discussed.

The degraded read head can be any of read heads 112, as indicated by the associated read error rate. In other examples, more than one degraded read head is identified. Once the degraded read head is identified, then data storage device 110 modifies an areal density associated with that degraded read head. Specifically, the areal density can be decreased for the degraded read head which reduces the density of data on the magnetic media portion associated with the degraded read head. The areal density for the degraded read head is modified to bring the read error rate below a read error rate threshold, such as bringing the read error rate below a SER threshold. Storage processor 111 can process the read error rates and a current areal density of the degraded read head to determine the modified areal density for the degraded read head.

Once the areal density for the degraded read head has been modified, the capacity of data storage device 110 can be affected. For example, when the areal density of the degraded read head is reduced or decreased, the data storage capacity for the associated magnetic media portion is reduced, and thus the total data storage capacity for data storage device 110. In some examples, this reduction in total data storage capacity is acceptable. However, in other examples, this reduction in total data storage capacity is not desirable, such in arrayed storage systems with many data storage devices of similar or same data storage capacity. In such examples, the areal density of at least one other read head can be modified to offset the areal density modification for the degraded read head. The modified areal density for the degraded read head can be distributed across all remaining non-degraded read heads, or applied to a single non-degraded read head. Further discussion of modifying the areal densities of degraded and non-degraded read heads can be found in FIGS. 3 and 4.

Figure 3:
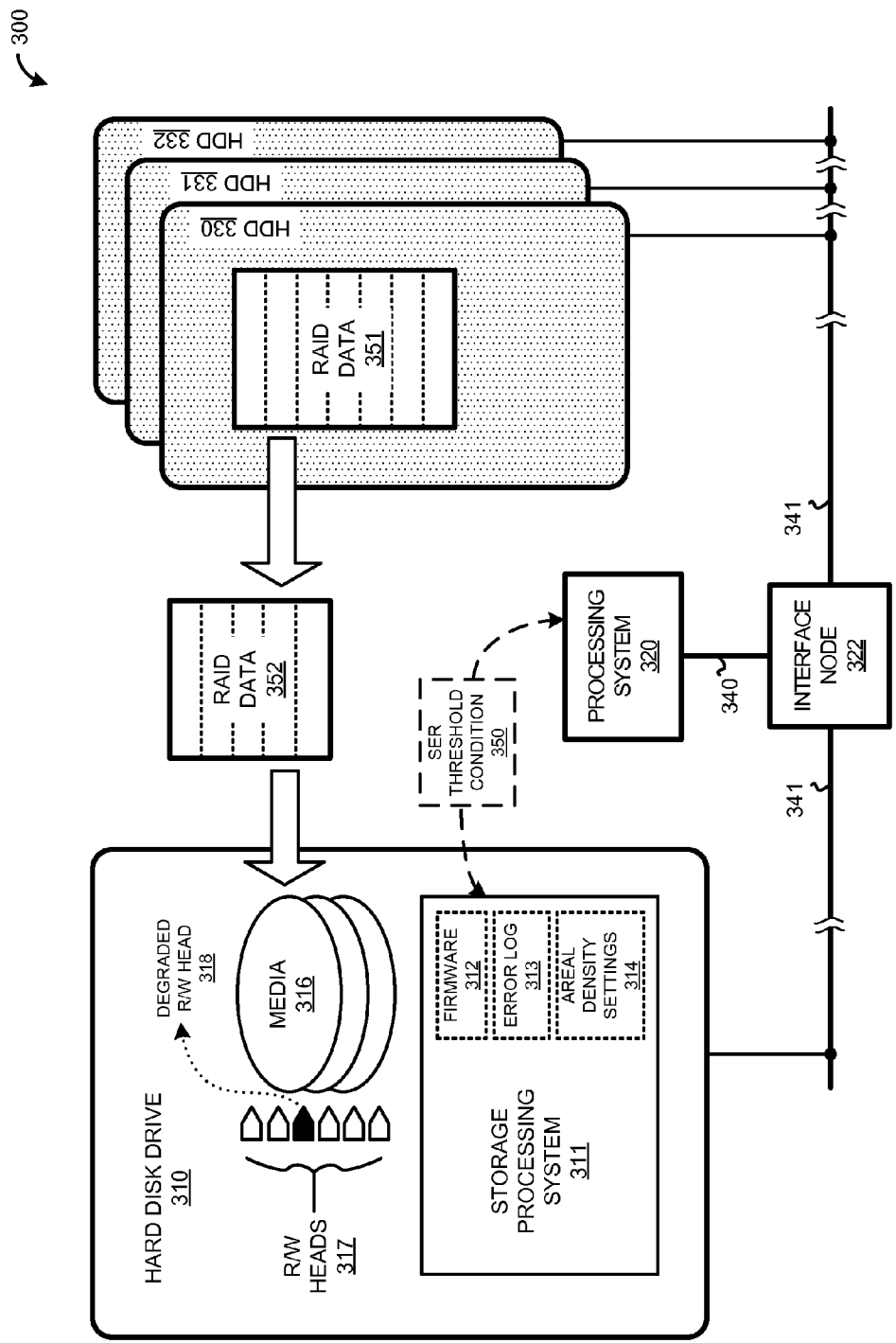
FIG. 3 is a system diagram illustrating a storage system.

As a further example of a data storage system, FIG. 3 is presented. FIG. 3 is a system diagram illustrating storage system 300. Storage system 300 includes hard disk drive 310, processing system 320, interface node 322, and RAID hard disk drives (HDD) 330-332.

Each of HDD 310 and 330-332 are communicatively coupled to each other and with at least interface node 322 over bus 341. Bus 341 can include any storage interface or communication interface, such as Peripheral Component Interconnect Express (PCIe) interface, serial ATA, Serial Attached Small Computer System Interface (SAS), Integrated Drive Electronics (IDE) interface, ATA interface, Universal Serial Bus (USB) interface, small computer serial interconnect (SCSI), Fiber Channel, serial communication interface, parallel communication interface, wireless interface, or other proprietary communication interfaces, including variations, combinations, and improvements thereof. Processing system 320 and interface node 322 communicate over link 340, which can comprise an inter-chip communication link or intra-chip communication link (when processing system 320 and interface node 322 are included in the same device). Communication link 340 can comprise a Direct Media Interface (DMI), PCIe interface, serial communication link, parallel communication link, or other communication link, including variations, combinations, and improvements thereof.

In operation, HDD 310 and 330-332 are storage devices in an arrayed storage system, such as a redundant array of independent disks (RAID) storage system. It should be understood that a different number of storage devices or communication links can be included in system 300 depending upon the RAID implementation or other storage or system considerations. Each HDD 310 and 320-332 can store data for later retrieval, with the data originating at processing system 320, such as in a computing environment, server, cloud computing system, personal computer, or other data storage system. Example data is included in FIG. 3 as RAID data 351 on HDD 330, and other data can be included on any of HDD 310 and 330-332. HDD 310 is shown including magnetic storage media, namely media 316. HDD 330-332 can also include magnetic storage media, although in this example HDD 330-332 can include any storage media, such as magnetic, optical, solid state, and the like.

HDD 310 includes storage processing system 311, storage media 316, and read/write (R/W) heads 317. Read/write heads 317 and storage media 316 are shown to illustrate elements of a magnetic storage device, such as a rotating magnetic storage system found in a hard disk drive, although variations and further elements are possible. Read/write heads 317 can write and read data from associated media portions of storage media 316, and are communicatively coupled to storage processing system 311 or other elements of HDD 310. In this example, three rotating magnetic media platters are shown for storage media 316, and six read/write heads are shown for reading and writing these platters. Each read/write head is configured to read/write a particular side of a particular platter.

HDD 310 can also include control elements, analog interfacing elements, mechanical control elements, among other elements to control, read, write, interface, and operate a hard disk drive. These other elements can include those described in FIG. 6, and can include preamp and read channel circuitry for controlling, reading, writing, or seeking a rotating magnetic medium, namely storage media 316. Storage processing system 311 also includes logic, processing elements, and communication elements for exchanging data over link 341, receiving and executing commands received over link 341, among other operations.

Storage processing system 311 of HDD 310 also includes computer readable storage portion, such as computer readable storage device, that includes firmware 312, error log 313, and areal density settings 314. Firmware 312 includes computer-readable instructions that can be executed by storage processor 311 to operate as described herein. Error log 313 includes a data structure for logging or monitoring at least SER information for each of read/write heads 317. Areal density settings 314 include a data structure that relates a present areal density for each read/write head 317. In some examples, areal density settings 314 include past or historical areal density information for read/writes heads 317. Each of elements 312-314 are discussed in further detail in FIG. 4 below.

Processing system 320 can comprise computing systems, server systems, cloud computing systems, or other processing systems, which can include processing elements, data transfer elements, and user interface elements. In some examples processing system 320 is a central processing unit of a computing device or computing system. In other examples, processing system 320 also includes memory elements, data storage and transfer elements, controller elements, logic elements, firmware, execution elements, and other processing system components. In yet other examples, processing system 320 comprises a RAID controller processor or storage system central processor, such as a microprocessor, microcontroller, Field Programmable Gate Array (FPGA), or other processing and logic device, including combinations thereof. Processing system 320 can include, or interface with, user interface elements which can allow a user of storage system 300 to control the operations of storage system 300 or to monitor the status or operations of storage system 300. These user interface elements can include graphical or text displays, indicator lights, network interfaces, web interfaces, software interfaces, user input devices, or other user interface elements.

Interface node 322 includes circuitry and elements for handling communications over link 341, such as logic, processing portions, buffers, transceivers, and the like. Interface node 322 can comprise an interconnect device, input/output controller hub, peripheral communication hub, north bridge device, south bridge device, storage array controller, RAID controller, or other communication interface node. Interface node 322 can include interworking functions to translate communications from a first format used over link 340 to a second format used over link 341, including translating among various signaling, voltages, bus widths, serial-to-parallel signaling, parallel-to-serial signaling, data speeds, throughput variations, and the like.

Figure 4:
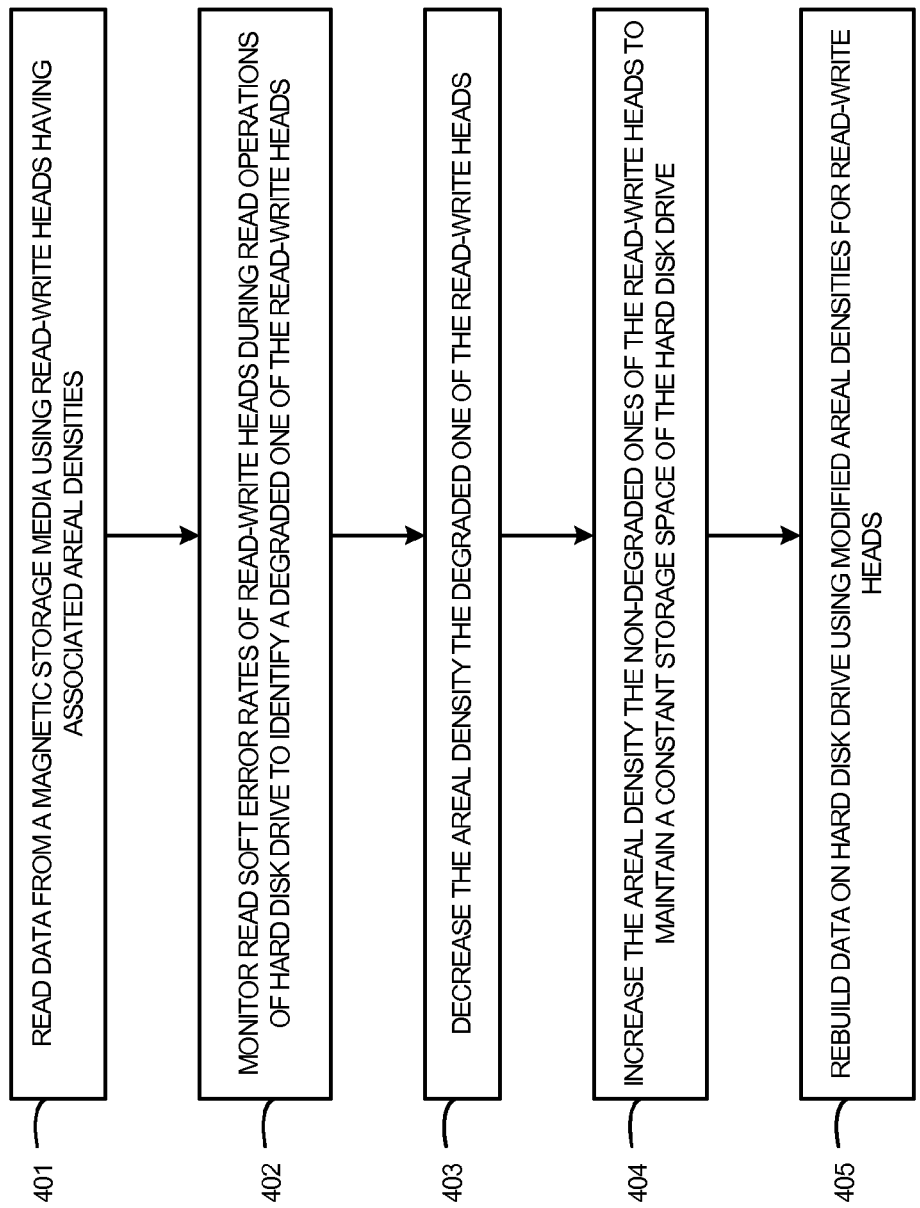
FIG. 4 is a sequence diagram illustrating a method of operation of a storage system.

As an example operation of storage system 300, FIG. 4 is presented. FIG. 4 is a flow diagram illustrating an example method of operating storage system 300 as well as elements of operating HDD 310. The operations of FIG. 4 are referenced herein parenthetically. In FIG. 4, HDD 310 reads (401) data from a magnetic storage media using read/write heads 317 having associated areal densities. In this example, the magnetic storage media is storage media 316 which is read using read/write heads 317. Reading and writing of data can occur during normal operation of HDD 310, such as responsive to read commands or write commands issued by processing system 320 over bus 341, among other operations. Storage processing system 311 can receive external read commands and write commands and responsively issue read commands and write commands to further equipment of HDD 310 for reading data from storage media 316 or writing data to storage media 316 using read/write heads 317.

The areal density associated with each of read/write heads 317 relates to a density of data on storage media 316, such as a recording linear density measured in BPI or a track density (TPI) used to write data to storage media 316. Typically, read/write heads 317 have individually different initial areal densities which are set during manufacturing of HDD 310. The areal density for a particular read/write head among read/write heads 317 relates to the density of data recorded or written on an associated portion of storage media 316, such as a side or face of a rotating magnetic platter. As data is written to storage media 316, the data is magnetically written at a particular areal density for the particular write portion of the read/write head. Once data is retrieved from storage media 316, the data is magnetically read at that same areal density as written with for the particular read head of the read/write head. Areal densities of each read/write head 317 can be stored in areal density settings 314 of storage processing system 311, such as in a table, data structure, list, or other data structure that correlates each read/write head to a current areal density.

HDD 310 monitors (402) read soft error rates (SER) of read/write heads 317 during read operations of HDD 310 to identify a degraded one of the read/write heads. As HDD 310 monitors the read error rates of read/write heads 317, these read error rates can exceed desirable levels, such as an error threshold level. Excessive read errors can indicate that a read portion of a read/write head is producing more errors than is desired during reading of data from an associated magnetic media portion, and indicates a degraded read head. The threshold error rate can indicate a threshold quantity of data bit errors, such as total number of bit errors, bit errors per second, or other measure of error rate. HDD 310 monitors read error rates for all read/write heads 317, and thus one or more read heads can experience degraded performance, although at different times. However, for clarity in this example a single degraded read head will be discussed, namely read/write head 318.

The read error rates can be determined by storage processing system 311 during user read operations of HDD 310, system maintenance reads, device self-test reads, background scan reads, among other reads, including combinations thereof. The read operations can be a subset of all read operations, or can include all read operations performed by HDD 310. The read error rates can be stored in a data structure included in a computer-readable memory device of HDD 310, and accessible by storage processing system 311. In this example, error log 313 is shown as an example data structure that includes a record or log of the read error rates of each read/write head of HDD 310. The read error rates can be accumulated over a period of time, such the entire operational lifetime of HDD 310, for the duration of the current power cycle, until a threshold amount of errors have been logged, or for other durations. In other examples, the read error rate can be ratio of a total number of bit errors and the total amount of bits read by a particular read head over a particular interval. This ratio can be processed by a $\log_{10}$ operation to determine a read error metric for the particular interval. The interval can be a time interval or a total number of bits read interval. In many examples, the read error rate of each read head is monitored and a separate record or tabulation for each read head is maintained.

HDD 310 decreases (403) the areal density the degraded one of the read/write heads. Once degraded read/write head 318 is identified, then storage processing system 311 of HDD 310 modifies an areal density associated with degraded read/write head 318. Specifically, the areal density is decreased for degraded read/write head 318 which reduces the density of data on the magnetic media portion associated with degraded read/write head 318. The areal density for degraded read/write head 318 is decreased to bring the read SER below the SER threshold. For example, a linear density (BPI) or a track density (TPI) for degraded read/write head 318 can be decreased to decrease the areal density. Storage processing system 310 can process the SER for degraded read/write head 318 and a current areal density of degraded read/write head 318 to determine the decreased areal density for degraded read/write head 318. The degreased areal density can be specified as an areal density curve to ramp or scale as the particular degraded read/write head moves from the outer edge to the inner edge of the surface of a particular magnetic media, due to circular geometries and rotational properties of the magnetic media.

HDD 310 increases (404) areal densities of the non-degraded ones of read/write heads 317 to maintain a constant storage space of HDD 310. Once the areal density for degraded read/write head 318 has been decreased, the capacity of HDD 310 is also correspondingly decreased. For example, a linear density (BPI) or a track density (TPI) for the non-degraded read/write heads can be increased to increase the areal density. In some examples, this reduction in total data storage capacity is acceptable due to the decreased areal density of degraded read/write head 318. However, in this example, this reduction in total data storage capacity is not desirable, due to HDD 310 being a part of a RAID storage array with HDD 330-332. The areal density of at least one other read/write head can be increased to offset the areal density decrease for degraded read/write head 318 and maintain a constant storage capacity for HDD 310. The increased areal density can be specified as an areal density curve to ramp or scale as the particular non-degraded read/write heads move from the outer edge to the inner edge of the surface of a particular magnetic media, due to circular geometries and rotational properties of the magnetic media.

The increased areal density can be distributed across all remaining non-degraded read/write heads, or applied to ones of the non-degraded read/write heads. For example, if the areal density of degraded read/write head 318 is decreased by 10%, then the areal density of another non-degraded read/write can be increased by 10% to offset the change in storage capacity from the areal density change of degraded read/write head 318. Alternatively, all remaining non-degraded read/write heads can have the 10% decrease of degraded read/write head 318 distributed throughout. For example, if six total read/write heads are in HDD 310, and one is degraded, five remain that are non-degraded. Thus, each non-degraded read/write head can have a 2% increase in areal density applied thereto. It should be understood that a subset of the non-degraded read/write heads can have a corresponding increase in areal density.

The change in areal density for any of the read portions of read/write heads 317 can be accompanied by a change in areal density for associated write portions of read/write heads 317. Specifically, if degraded read/write head 318 has a read head portion decreased in areal density, then the write head portion associated with read/write head 318 also has an areal density decreased by that same amount. The decrease in the write head areal density ensures that data is written to storage media 316 using read/write head 318 at the same areal density as is used for reading the data using read/write head 318. Likewise, any further read/write heads with modified areal densities, such as increased areal densities of read head portions of non-degraded ones of read/write heads 317, can have write head portions with correspondingly increased areal densities.

To select which read/write heads should be increased in areal densities, HDD 310 can consider various factors. One factor is a current areal density of a non-degraded read/write head. A read/write head with a current areal density that is higher than other read/write heads might already be near a limit for areal density for the particular read/write head technology. Therefore, a read/write head with a higher than average current areal density can be omitted when distributing the decreased areal density of the degraded read/write head. Alternatively, a smaller portion of the total areal density increase can be apportioned to a read/write head with a higher than average current areal density. Likewise, each non-degraded read/write head can have an amount of the offsetting increased areal density apportioned based on a current areal density. In other examples, non-degraded read/write heads with the greatest operating margin can have the largest portions of the offsetting increased areal density apportioned thereto. The operating margins can be identified by the error logs or quantity of soft errors over time. Additionally, some non-degraded read/write heads may exhibit inconsistent performance over time, such as times of bursts of errors and times of few errors. Inconsistent read/write heads can be omitted from the non-degraded read/write heads included in the offsetting increased areal density apportioning.

Additionally, more than one degraded read/write might be found, and the change in areal density of all of the degraded read/write heads can be distributed as increased areal densities across ones of the non-degraded read/write heads. If support for more than one degraded read/write head is desired, then apportioning the offsetting increased areal density for a first degraded read/write head can be distributed over only one half of the non-degraded read/write heads. When a second degraded read/write head is encountered, then the second half of the non-degraded read/write heads can be used to apportion the offsetting increased areal density for the second degraded read/write head. Other distributions and apportionment are possible.

In yet further examples, changes in the read error rates for each read/write head can be monitored over time. These changes in read error rates can be projected to establish a future or predicted read error rate for ones of the read/write heads. The selection of which non-degraded read/write heads to increase in areal density can be based on these predicted read error rates. For example, if a particular non-degraded read/write head has a predicted error rate that will soon exceed an error rate threshold, then that non-degraded read/write head can be omitted from the apportioning of the offsetting increased areal density for a first degraded read/write head.

HDD 310 rebuilds (405) data on HDD 310 using the modified areal densities for read/write heads 317. Since the areal density has changed for at least one of read/write heads 317, the data previously stored on the media portion associated with the changed read/write head is no longer valid or readable. Likewise, if all read/write heads 317 of HDD 310 are modified, then all data on HDD 310 can be considered invalid. In some examples, data stored on HDD 310 is first backed up to another storage device and returned to HDD 310 once the areal density adjustments are complete. In other examples, such as in RAID environments, a data recovery process can be performed, such as transferring portions of RAID data 351 of HDD 330 as RAID data 352 for storage on HDD 310 over at least link 341. The RAID recovery process can include generating RAID data 352 from parity data stored on ones of HDD 330-332, and storing RAID data 352 on HDD 310. The RAID recovery process can instead include transferring data from a mirrored data storage device among HDD 330-332. Advantageously, if a read/write head portion of HDD 310 becomes degraded, HDD 310 can be quickly returned to operational service through using modified areal densities.

In further examples, processing system 320 can be involved in read error monitoring, areal density determination, and error logging, among other operations. For example, SER thresholds can be set by processing system 320, such as received over a user interface from a user of processing system 320. Likewise, when the SER thresholds are met, an indication of the SER threshold condition can be transferred for delivery to processing system 320 for a user or application to responsively modify areal densities or for error reporting and logging. As one example, SER threshold condition information 350 is shown in FIG. 3.

In yet further examples, a self-rebuild of HDD 310 can be performed. In this self-rebuild, HDD 310 can relocate data stored on portions of the magnetic media associated with degraded read/write head 318 onto portions of the magnetic media associated with non-degraded read/write heads or to a cache or memory storage portion separate from the magnetic media of HDD 310. Once the areal density of degraded read/write head 318 is changed as described above, then the relocated data can be moved back to the portions of the magnetic media associated with degraded read/write head 318.

Figure 5:
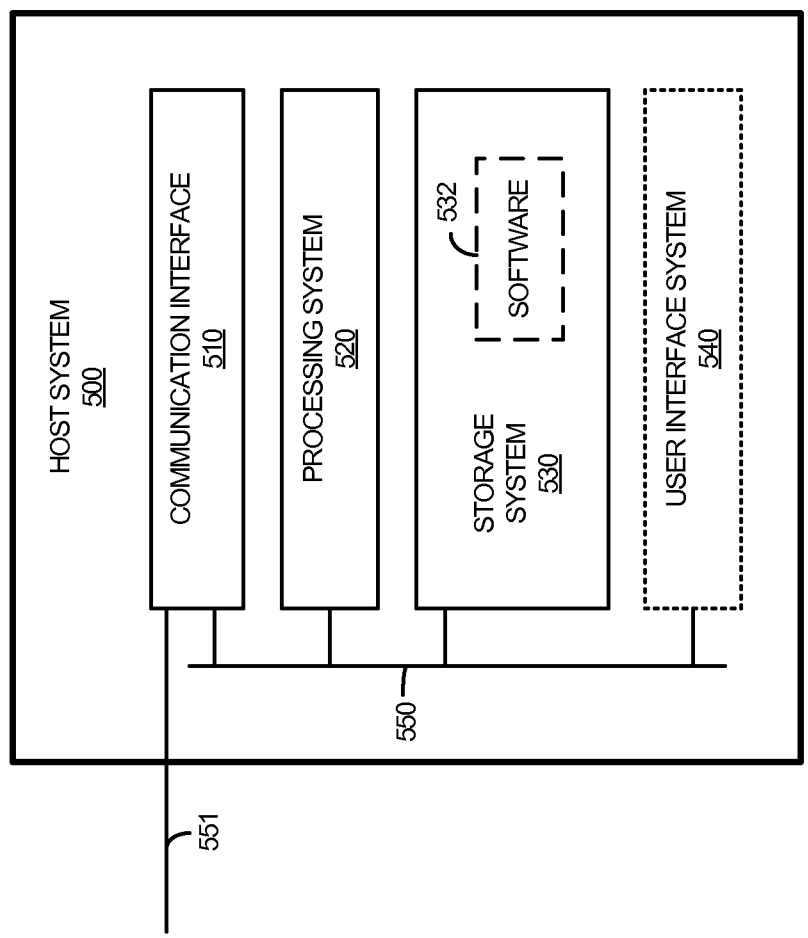
FIG. 5 is a block diagram illustrating a host system.

FIG. 5 is a block diagram illustrating host system 500. Host system 500 can include equipment and systems as discussed herein for host system 120 in FIG. 1, processing system 320 of FIG. 3, or interface node 322 of FIG. 3, although variations are possible. Host system 500 includes communication interface 510, processing system 520, storage system 530, and optionally, user interface system 540. In operation, processing system 520 is operatively linked to communication interface 510, storage system 530, and user interface system 540 by bus 550. It should be understood that discrete links can be employed, such as network links or other circuitry. Host system 500 can be distributed or consolidated among equipment or circuitry that together forms the elements of host system 500. Host system 500 can optionally include additional devices, features, or functionality not discussed here for purposes of brevity.

Communication interface 510 includes one or more interfaces for communicating with communication networks, data busses, data links, or other devices, such as bus 130 of FIG. 1 or links 340-341 of FIG. 3. The interfaces can include any serial or parallel digital interfaces, or other communication and data interfaces, including combinations, variations, and improvements thereof. Examples of communication interface 510 include logic, transmission gates, buffers, network interface card equipment, transceivers, modems, and other communication circuitry. In this example, communication interface 510 communicates over at least link 551. Link 551 can include any communication link as described herein, such as that described for link 130 in FIG. 1 or links 340-341 in FIG. 3.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any computer readable storage media readable by processing system 520 and capable of storing software 532. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by host system 500 in general or processing system 520 in particular, direct host system 500 or processing system 520 to instruct data storage devices to store or retrieve data on computer-readable media, receive read error rate information from data storage devices, process the read error rates and areal densities for read heads of the data storage devices to determine modified areal densities for the read heads, control transfer of data from one data storage device to another data storage device, setup and maintain RAID or other storage arrays, report error rates and areal density information to a user interface system or to other systems, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to instruct data storage devices to store or retrieve data on computer-readable media, receive read error rate information from data storage devices, process the read error rates and areal densities for read heads of the data storage devices to determine modified areal densities for the read heads, control transfer of data from one data storage device to another data storage device, setup and maintain RAID or other storage arrays, report error rates and areal density information to a user interface system or to other systems, among other operations.

In general, software 532 can, when loaded into processing system 520 and executed, transform processing system 520 overall from a general-purpose computing system into a special-purpose computing system customized to instruct data storage devices to store or retrieve data on computer-readable media, receive read error rate information from data storage devices, process the read error rates and areal densities for read heads of the data storage devices to determine modified areal densities for the read heads, control transfer of data from one data storage device to another data storage device, setup and maintain RAID or other storage arrays, report error rates and areal density information to a user interface system or to other systems, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Optional user interface system 540 includes equipment and circuitry for receiving user input and control, such as for engaging in storage management operations, displaying error rate or areal density information, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, web interfaces, software interfaces, or other human-interface equipment. User interface system 540 also includes equipment to communicate information to a user of host system 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Bus 550 comprises a physical, logical, or virtual communication link, capable of communicating data, control signals, and communications, along with other information. In this example, bus 550 also includes elements such as wires, circuit board traces, solid state interconnect, or other elements. In some examples, portions of bus 550 are encapsulated within the elements of host system 500, and can be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks.

Figure 6:
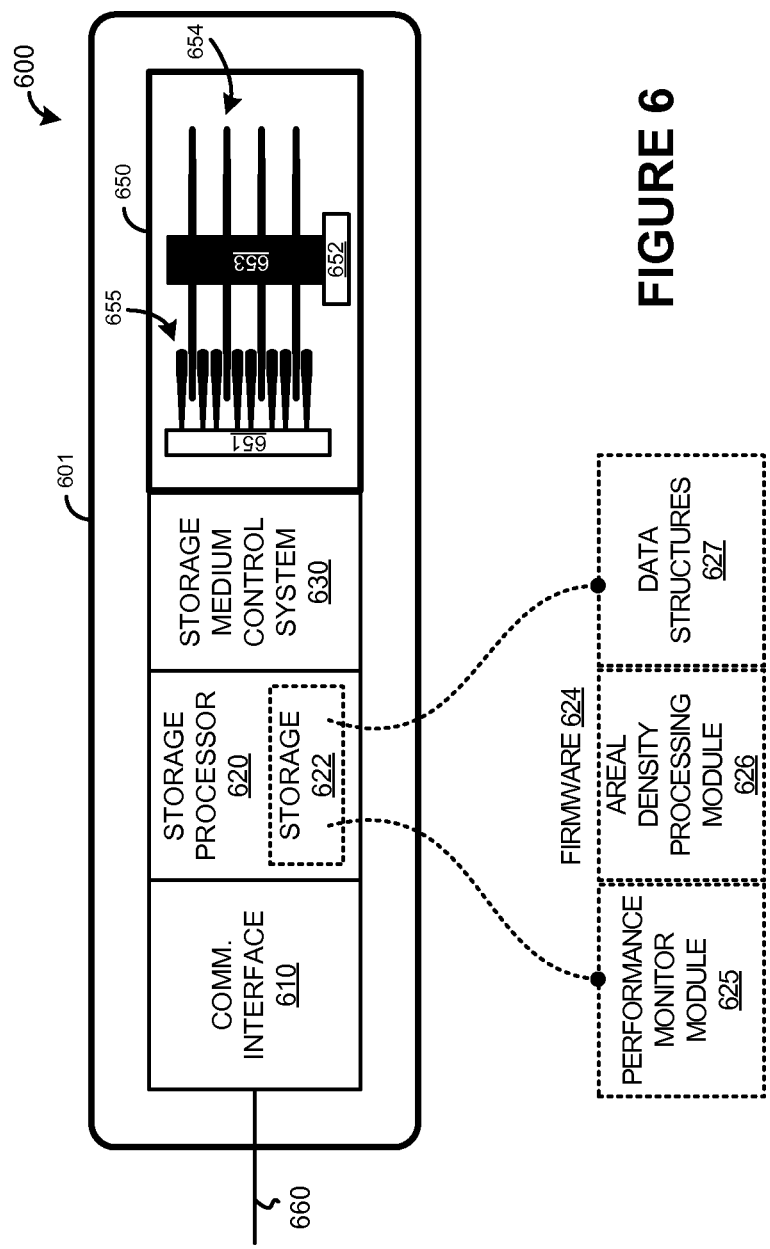
FIG. 6 is a block diagram illustrating a data storage device.

FIG. 6 is a block diagram illustrating data storage device 600. Data storage device 600 can include equipment and systems as discussed herein for data storage device 110 in FIG. 1 and HDD 310 and 330-332 in FIG. 3, although variations are possible. Data storage device 600 includes communication interface 610, storage processor 620, storage media control system 630, and magnetic storage media portion 650. In operation, storage processor 620 is operatively and communicatively linked to communication interface 610, servo control 630, media interface 640, and magnetic storage media portion 650. It should be understood that discrete links can be employed, such as individual communication, power, and control links or other circuitry. Data storage device 600 can be distributed or consolidated among equipment or circuitry that together forms the elements of data storage device 600. Data storage device 600 can include enclosure 601 which can enclose or structurally support ones of the elements of data storage device 600. Data storage device 600 can optionally include additional devices, features, or functionality not discussed here for purposes of brevity.

Communication interface 610 includes one or more interfaces for communicating with communication networks, storage data busses, storage data links, or other devices, such as bus 130 of FIG. 1 or links 340-341 of FIG. 3. The interfaces can include any serial or parallel digital interfaces, or other communication and data interfaces, including combinations, variations, and improvements thereof. Examples of communication interface 610 include logic, transmission gates, buffers, network interface card equipment, transceivers, and other communication circuitry. In this example, communication interface 610 communicates over at least link 660. Link 660 can include any communication link as described herein, such as that described for links 130 in FIG. 1 or links 340-341 in FIG. 3.

Storage processor 620 can comprise one or more microprocessors, microcontrollers, application specific integrated circuit (ASIC) processors, or FPGA elements and other circuitry that retrieves and executes firmware 624 from storage system 622. Storage processor 620 can be implemented within a single processing device but can also be distributed across multiple processing devices or sub-systems that cooperate in executing program instructions. Examples of storage processor 620 include general purpose central processing units, application specific processors, and logic devices, as well as any other type of processing device, combinations, or variations thereof.

Storage system 622 can include any computer readable storage media readable by storage processor 620 and capable of storing firmware 624, such as a computer readable storage device. The computer readable storage media that stores firmware 624 can include volatile and nonvolatile, removable and non-removable media implemented in any method or technology for storage of information, such as computer readable instructions, data structures, program modules, or other data. In addition to storage media, in some implementations the computer readable storage media can also include communication media over which firmware 624 can be communicated. The computer readable storage media that stores firmware 624 can be implemented as a single storage device but can also be implemented across multiple storage devices or subsystems co-located or distributed relative to each other. The computer readable storage media that stores firmware 624 can comprise additional elements, such as a controller, capable of communicating with storage processor 620. Examples of storage media include random access memory, read only memory, flash memory, or any other medium which can be used to store the desired information and that can be accessed by an instruction execution system, as well as any combination or variation thereof, or any other type of storage media. In no case is the storage media a propagated signal.

Firmware 624 can be implemented in program instructions and among other functions can, when executed by data storage device 600 in general or storage processor 620 in particular, direct data storage device 600 or storage processor 620 to process write commands to store data onto magnetic storage media portion 650, process read commands to retrieve data from magnetic storage media portion 650, receive data from other devices and systems, transfer data to other devices and systems, monitor read error rates of read/write heads during operation of a data storage device to identify a degraded one of the read/write heads, and process at least the read error rates and an areal density of the degraded one of the read/write heads to modify the areal density of at least the degraded one of the read heads, among other operations. Firmware 624 can include additional processes, programs, or components, such as operating system software, database software, or application software. Firmware 624 can also comprise some other form of machine-readable processing instructions executable by storage processor 620.

In at least one implementation, firmware 624 includes performance monitoring module 625, areal density processing module 626, and data structures 627. Performance monitoring module 625 at least monitors read error rates of read/write heads during operation of a data storage device to identify a degraded one of the read/write heads. Performance monitoring module 625 can store error information, such as error logs, soft error rate information, or other performance information regarding read/write heads 655 in portions of data structures 627, such as a table, log, database, or other data structure. Areal density processing module 626 at least processes at least the read error rates and an areal density of degraded ones of the read/write heads to modify the areal density of at least the degraded one of the read heads or modify the areal densities of non-degraded read/write heads. Current and past areal density information can be stored in portions of data structure 627.

In general, firmware 624 can, when loaded into storage processor 620 and executed, transform storage processor 620 overall from a general-purpose computing system into a special-purpose computing system customized to process write commands to store data onto magnetic storage media portion 650, process read commands to retrieve data from magnetic storage media portion 650, receive data from other devices and systems, transfer data to other devices and systems, monitor read error rates of read/write heads during operation of a data storage device to identify a degraded one of the read/write heads, and process at least the read error rates and an areal density of the degraded one of the read/write heads to modify the areal density of at least the degraded one of the read heads, among other operations. Encoding firmware 624 on a computer readable storage media can transform the physical structure of the computer readable storage media. The specific transformation of the physical structure can depend on various factors in different implementations of this description. Examples of such factors can include, but are not limited to the technology used to implement the storage media of the computer readable storage media and whether the computer readable storage media are characterized as primary or secondary storage. For example, if the computer-storage media are implemented as semiconductor-based memory, firmware 624 can transform the physical state of the semiconductor memory when the program is encoded therein. For example, firmware 624 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Storage media control system 630 includes circuitry, devices, and equipment for transferring write data to magnetic storage media portion 650 and reading data from magnetic storage media portion 650. In examples of rotating magnetic media, such as hard disk drives, storage media control system 630 can comprise preamp circuitry, read channel circuitry, servo control systems, channel seek/track systems, write circuitry, step-up voltage converters, buffers, line amplifiers, and other circuitry and equipment.

Magnetic storage media portion 650 includes servo/armature 651, motor 652, spindle 653, platters 654, and read/write heads 655. The elements shown in FIG. 6 for magnetic storage media portion 650 are merely representative of a rotating magnetic media system and associated mechanisms, other elements are omitted for clarity.

Motor 652 rotates spindle 653 which in turn rotates connected platters 654. Platters 654 comprise magnetic storage media comprised of aluminum or glass and ceramic substrates along with magnetic recording surfaces. Typically each flat side or surface of each platter is used as a magnetic recording medium. Servo/armature 651 includes mechanical servo motors, control circuitry, drive circuitry, arms, and other features for moving read/write heads 655 over the surfaces of platters 654. Read/write heads 655 are magnetic read/write heads which are mounted onto portions of servo/armature 651. Read/write heads 655 can each comprise magnetic inducing and sensing materials for writing to and reading from magnetic media, such as platters 654. Read/write heads 655 can comprise magneto-resistive (MR) elements, giant magneto-resistive (GMR) elements, perpendicular magnetic recording (PMR) elements, shingled magnetic recording (SMR) elements, among other magnetic writing and reading elements. Each of read/write heads 655 has an associated areal density that is used for recording or reading data from ones of platters 654.

Returning to the elements of FIG. 1, data storage device 110 includes one or more computer readable storage media 113 accessible via one or more read heads 112. Storage processor 111 is shown as an example of processing and interfacing elements of data storage device 110. Data storage device 110 can include further elements, such as those discussed for data storage device 600 in FIG. 6. Data storage device 110 can comprise a hard disk drive or other computer readable storage device. The computer readable storage media of data storage device 110 includes rotating magnetic storage media, such as storage media 113, but can additionally include other media, such as employed in a cache or cache system of data storage device 110. These other media can include solid state storage media, optical storage media, non-rotating magnetic media, phase change magnetic media, spin-based storage media, or other storage media, including combinations, variations, and improvements thereof. Storage media 113 can employ various magnetic storage schemes, such as shingled magnetic recording (SMR), non-shingled magnetic recording, perpendicular magnetic recording (PMR), including combinations, variations, and improvements thereof.

Host system 120 can include processing elements, data transfer elements, and user interface elements. In some examples host system 120 is a central processing unit of a computing device or computing system. In other examples, host system 120 also includes memory elements, data storage and transfer elements, controller elements, logic elements, firmware, execution elements, and other processing system components. In yet other examples, host system 120 comprises a RAID controller processor or storage system central processor, such as a microprocessor, microcontroller, Field Programmable Gate Array (FPGA), or other processing and logic device, including combinations thereof. Host system 120 can include, or interface with, user interface elements which can allow a user of storage system 100 to control the operations of storage system 100 or to monitor the status or operations of storage system 100. These user interface elements can include graphical or text displays, indicator lights, network interfaces, web interfaces, software interfaces, user input devices, or other user interface elements. Host system 120 can also include interface circuitry and elements for handling communications over bus 130, such as logic, processing portions, buffers, transceivers, and the like.

Bus 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although bus 130 is shown in FIG. 1, it should be understood that one or more discrete links can be employed between the elements of storage system 100.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
   magnetic storage media configured to store data;
   read heads configured to read data from the magnetic storage media at associated areal densities; and
   a storage processor configured to:
   monitor read error rates of the read heads during operation of the data storage device to identify a degraded one of the read heads, the degraded one of the read heads having degraded from performance determined during manufacture of the data storage device;
   process at least the read error rates and an areal density of the degraded one of the read heads to decrease the areal density of at least the degraded one of the read heads when the read error rate of the degraded one of the read heads exceeds a threshold error rate; and
   increase an areal density for at least another one of the read heads when the read error rate of the degraded one of the read heads exceeds the threshold error rate to at least offset the decrease in the areal density of the degraded one of the read heads and maintain a constant storage space for the data storage device.

2. The data storage device of claim 1, comprising:
   the storage processor configured to increase the areal densities of for all remaining ones of the read heads when the read error rate of the degraded one of the read heads exceeds the threshold error rate to at least offset the decrease in the areal density of the degraded one of the read heads and maintain a constant storage space for the data storage device.

3. The data storage device of claim 2, comprising:
   the storage processor configured to decrease an areal density for a write head associated with the degraded read head, wherein the decrease in the areal density for the write head corresponds to the decrease in areal density for the degraded read head;
   the storage processor configured to increase associated areal densities for write heads associated with the remaining ones of the read heads to maintain the constant storage space for the data storage device.

4. The data storage device of claim 1, comprising:
   the storage processor configured to decrease an areal density for a write head associated with the degraded read head, wherein the decrease in the areal density for the write head corresponds to the decrease in areal density for the degraded read head.

5. The data storage device of claim 1, wherein the read error rates comprise soft error rates (SER).

6. The data storage device of claim 1, wherein the associated areal densities each comprise an areal density set during the manufacture of the data storage device for each read head.

7. The data storage device of claim 1, further comprising:
   a communication interface configured to receive write data for storage on the magnetic storage media and to receive instructions to retrieve read data stored on the magnetic storage media;
   an enclosure configured to enclose at least one of the magnetic storage media, the read heads, the storage processor, and the communication interface.

8. A storage processor, comprising:
   a performance monitor module configured to monitor read error rates of read heads of a data storage device during operation of the data storage device to identify a degraded one of the read heads, the degraded one of the read heads having degraded from performance determined during manufacture of the data storage device, wherein the read heads are configured to read data from magnetic storage media of the data storage device at associated areal densities; and an areal density processing module configured to process at least the read error rates and an areal density of the degraded one of the read heads to decrease the areal density of at least the degraded one of the read heads when the read error rate of the degraded one of the read heads exceeds a threshold error rate; and the areal density processing module configured to increase an areal density for at least another one of the read heads when the read error rate of the degraded one of the read heads exceeds the threshold error rate to at least offset the decrease in the areal density of the degraded one of the read heads and maintain a constant storage space for the data storage device.

9. The storage processor of claim 8, comprising:

the areal density processing module configured to increase the areal densities of for all remaining ones of the read heads when the read error rate of the degraded one of the read heads exceeds the threshold error rate to at least offset the decrease in the areal density of the degraded one of the read heads and maintain a constant storage space for the data storage device.

10. The storage processor of claim 9, comprising:

the areal density processing module configured to decrease an areal density for a write head associated with the degraded read head, wherein the decrease in the areal density for the write head corresponds to the decrease in areal density for the degraded read head;

the areal density processing module configured to increase associated areal densities for write heads associated with the remaining ones of the read heads to maintain the constant storage space for the data storage device.

11. The storage processor of claim 8, comprising:

the areal density processing module configured to decrease an areal density for a write head associated with the degraded read head, wherein the decrease in the areal density for the write head corresponds to the decrease in areal density for the degraded read head.

12. The storage processor of claim 8, wherein the read error rates comprise soft error rates (SER).

13. The storage processor of claim 8, wherein the associated areal densities each comprise an areal density set during the manufacture of the data storage device for each read head.

14. The storage processor of claim 8, comprising:

the performance monitor module configured to maintain a data structure that includes the a read error rates for each of the read heads measured over a period of time.

15. A method of operating a data storage processor, the method comprising:

monitoring read error rates of read heads of a data storage device during operation of the data storage device to identify a degraded one of the read heads, the degraded one of the read heads having degraded from performance determined during manufacture of the data storage device, wherein the read heads are configured to read data from magnetic storage media of the data storage device at associated areal densities; and processing at least the read error rates and an areal density of the degraded one of the read heads to decrease the areal density of at least the degraded one of the read heads when the read error rate of the degraded one of the read heads exceeds a threshold error rate; and increasing an areal density for at least another one of the read heads when the read error rate of the degraded one of the read heads exceeds the threshold error rate to at least offset the decrease in the areal density of the degraded one of the read heads and maintain a constant storage space for the data storage device.

* * * * *